United States Patent

Bond et al.

[11] Patent Number: 6,002,138
[45] Date of Patent: Dec. 14, 1999

[54] HOLLOW COVERING DEVICE FOR LIGHTWAVE OR RADIANT ENERGY SYSTEMS

[75] Inventors: C. Ward Bond, Baton Rouge, La.; David F. Steed, Santa Barbara; William F. Crandall, Jr., Sausalito, both of Calif.

[73] Assignee: Talking Signs, Inc., Baton Rouge, La.

[21] Appl. No.: 08/834,185

[22] Filed: Apr. 15, 1997

Related U.S. Application Data

[63] Continuation-in-part of application No. 08/539,358, Oct. 5, 1995, abandoned.

[51] Int. Cl.[6] .................................................. H04B 10/00
[52] U.S. Cl. ........................................ 250/504 R; 359/154
[58] Field of Search ........................... 250/504 R, 493.1, 250/494.1, 495.1; 359/154, 180

[56] References Cited

U.S. PATENT DOCUMENTS 5,159,480  10/1992  Gordon et al. ...................... 250/495.1
5,191,460   3/1993  Lapatovich ......................... 250/504 R Primary Examiner—Kiet T. Nguyen
Attorney, Agent, or Firm—John F. Sieberth; R. Andrew Patty II

[57] ABSTRACT

A unitary hollow device adapted for covering a source of lightwave energy, apparatus comprising the combination of such device and such energy source, and a system comprised of a combination of the apparatus and a portable directional receiver. The energy source can be as simple as one or more light bulbs. However preferably the combination involves use of an array of light emitting diodes for transmitting infrared signals from fixed installations to be picked up by print-disabled persons with hand-held receivers which convert the signals to intelligible communication to enable the persons to be guided to desired locations. The device protects the energy source from accumulation of dust and other debris yet is configured to provide little, if any, interference with the transmission of the emitted signals. The device also conceals the energy source to thereby diminish theft and vandalism.

13 Claims, 3 Drawing Sheets

HOLLOW COVERING DEVICE FOR LIGHTWAVE OR RADIANT ENERGY SYSTEMS

REFERENCE TO RELATED APPLICATION

This application is a continuation-in-part of U.S. patent application Ser. No. 08/539,358, filed Oct. 5, 1995, now abandoned.

TECHNICAL FIELD

This invention relates to a hollow cover device adapted for use in connection with the transmission of radiant energy, especially lightwave energy such as infrared, and to systems comprising the combination of the cover device and means for transmitting such energy through the cover device.

BACKGROUND

Until relatively recently, persons who are blind, have low vision or are learning disabled or otherwise print handicapped are denied access and orientation that the general population takes for granted in every day life. Finding their way is a challenging event often ending with asking strangers' help. Whether getting on the right bus, finding a restroom or a telephone, determining directions to elevators or exits, crossing streets or understanding directories in public places, these populations are placed at a great disadvantage and often in danger. Directional "wayfinding" devices have not existed to provide them the ability to "read and see" remote signs.

In recent years an information and wayfinding system has been developed for assisting blind, low-visioned and otherwise print-handicapped individuals. The system, marketed under the trademark Talking Signs®, consists of infrared transmitters and receivers. Transmitters are placed on key signs in the environment which continually transmit the message of the sign. The receiver is carried by the person who activates it when direction or information is desired.

Transmitters of lightwave signals, especially infrared signals, such as used in the Talking Signs® system referred to above, must effectively deliver a frequency modulated infrared signal (preferably continuous) having a unique set of characteristics so that the signal can be sensed by a portable, hand-held receiver which in turn converts the signal into intelligible communication for the person carrying the receiver. For example, the transmitters may comprise an array of single or multi-channel emitters each of which delivers the frequency modulated infrared signal in the pattern of a cone having a beam width in the range of about 10° to about 50° at a modulated frequency of about 25 KHz with band width in the range of about 3 to about 6 KHz and having an infrared carrier frequency in the range of about 850 to about 950 nanometers. At the same time the transmitter system must be suitably covered to protect the system against excessive accumulation in the system of dust or other debris, and to minimize or deter vandalism, theft, breakage or other activities that would interfere with proper performance of the transmitter system.

SUMMARY OF THE INVENTION

This invention makes it possible to effectively cover and camouflage such transmitter systems without significantly reducing the strength of the transmitted signal. The covering of this invention is such that the transmitter under the cover is not clearly visible to the naked eye yet the color of the transmitter or other objects under the cover is visible to the naked eye. At the same time, the covering does not materially interfere with the emitted lightwave signal such as the infrared signal having the special characteristics noted above.

Accordingly, in one of its embodiments this invention provides a unitary hollow device which comprises a body comprising a translucent centrally-disposed forwardly projecting portion having a front face and a back face, the projecting portion having an infrared transparency in the range of about 0.75 to about 0.95, more preferably in the range of about 0.80 to about 0.90, and most preferably of about 0.90. As used throughout this description and the appended claims, infrared transparency (T) is defined as the ratio between the intensity of infrared light transmitted through the device ($I_t$) to the intensity of the incidental infrared light (i.e., the infrared light before it is transmitted through the device, $I_i$), expressed in the following formula:

$$T = \frac{I_t}{I_i}$$

Also, as used throughout this description and the appended claims, translucent means admitting and diffusing visible light so that objects beyond cannot be clearly perceived by the naked eye, while still permitting the perception of color by the naked eye.

In a preferred embodiment, the body further comprises a translucent, planar peripheral segment, and the device is further characterized in that: a) the segment and the projecting portion are contiguous with each other; and b) the projecting portion defines a hollow interior space between the back face and the plane occupied by the planar peripheral wall segment. The device is thus configured for mounting against generally flat surfaces such as walls, ceilings, signboards, and suitable generally flat surfaces of bookshelves and other large furniture or fixtures, buses, railroad passenger cars, subway cars, elevators, escalators, and the like.

The body of this device is formed from a thermoplastic material in preferred embodiments of this invention. A particularly preferred thermoplastic material for this use is unfilled acrylonitrile butadiene styrene (ABS). In another preferred embodiment of this invention, the plastic material used to form the projecting portion, or preferably the entire body, of the device is optically transparent, and the device is formed by a process which comprises treating or molding one or more of the faces of the projecting portion to mark the surface thereof, thereby rendering the projecting portion translucent. Examples of methods for treating the faces include sand-blasting, chemical etching or other abrasive processes which scratch or scar the surface to render the projecting portion translucent without causing the infrared transparency to fall outside of the specified range of this invention. Preferably, sand-blasting is conducted evenly over all surfaces of the device using sand which is commonly referred to as sugar sand, or the like. Alternatively, the device may be molded so as to form dents or scratches in the surface of one or more faces of the projecting portion, or on the entire surface of the device. Plastics, nonhomogeneous plastic blends or plastic and filler blends which cause the solid form of the plastic or plastic blend to be translucent, may also be used as an alternative to surface treatment or molding to make the projecting portion, or preferably the entire body, translucent.

While numerous other configurations, including that of a semi-sphere, rectangle, triangle, ellipse, and the like are within the scope of this invention, the most preferred outer configuration for the projecting wall portion of the device of this invention is that of a symmetrical four sided frusto-pyramid, i.e., a symmetrical four-sided pyramid from which the apex portion has been cut off in a horizontal plane thereby providing a bezel configuration composed of four equally sized and shaped symmetrical trapezoidal sides or facets and a square central face.

In another preferred embodiment, the device is formed from an optically transparent plastic material which has been surface treated or molded as described above, and which contains a substantially uniform amount of a dark coloration such as, for example, a dark brown, a brownish-black, a dark blue or a dark green coloration whereby the projecting portion is dark enough to provide additional visual concealment for items or apparatus disposed behind the projecting wall portion.

When the translucent device of this invention is mounted on a flat surface by means of suitable fasteners such as wood screws or machine screws, the items disposed behind the projecting portion—which may be encased in a recessed member such as a wall outlet box or the like—are covered and largely concealed from view. Moreover, in a preferred embodiment, the color of the items disposed behind the projecting portion are visible through the device. In such cases, it is preferable that the items so disposed behind the projecting portion be painted in the color of the surrounding flat surface, whereby the device blends into the surrounding flat surface and is made even less noticeable to passersby than would be the case if the color of the objects behind the device were of another color. Thus, for example, it is preferred that, when installing the device of this invention on a white wall, items such as a transmitter circuit board installed behind or under the device be painted white.

Another embodiment of this invention is apparatus for delivering directional lightwave energy which comprises:

I) a unitary hollow device for covering at least one source of radiant energy, which device comprises (a) a planar peripheral wall segment, and (b) a translucent centrally-disposed forwardly projecting portion having a front face and a back face, the device being further characterized in that the projecting portion (A) defines a hollow interior space between the back face of the projecting portion and the plane occupied by the planar peripheral wall portion, and (B) has an infrared transparency in the range of about 0.75 to about 0.95; and II) at least one transmitter for producing and transmitting a lightwave signal;

whereby the transmitter may be disposed in a preselected location surrounded by a substantially flat planar surface, and whereby the planar peripheral wall segment of the unitary hollow device may be attached to such substantially flat planar surface and may be disposed in front of the transmitter so that at least a portion of the transmitter is within the hollow interior space. In this embodiment it is preferred that at least a portion of the transmitter is disposed within the hollow interior space between the back face of the projecting portion and the plane occupied by the planar peripheral wall portions. As noted above, the remainder of the transmitter can be, and typically is, encased in a recessed space such as in an outlet box, the front of which is entirely covered by the unitary hollow device of this invention. And in each case, each transmitter is disposed such that the emitted signal is transmitted through the projecting wall portion. In this embodiment, the most preferred transmitter comprises an array of single channel emitters such as an array of infrared light emitting diodes (IR LEDs) delivering the frequency modulated infrared signal in the pattern of a cone having a beam width in the range of about 10° to about 50° at a modulated frequency of about 25 KHz with band width of about 6 KHz and having an infrared carrier frequency in the range of about 850 to about 950 nanometers.

Yet another embodiment of this invention is a system for delivering and receiving directional lightwave energy which comprises:

I) a unitary hollow device for covering at least one source of radiant energy, which device comprises (a) a planar peripheral wall segment, and (b) a translucent centrally-disposed forwardly projecting portion having a front face and a back face, the device being further characterized in that the projecting portion (A) defines a hollow interior space between the back face of the projecting portion and the plane occupied by the planar peripheral wall portion, and (B) has an infrared transparency in the range of about 0.75 to about 0.95;

II) at least one transmitter for producing and transmitting a lightwave signal; and III) a portable directional receiver for receiving the lightwave signal;

whereby the transmitter may be disposed in a preselected location surrounded by a substantially flat planar surface and whereby the planar peripheral wall segment of the unitary hollow device may be attached to such substantially flat planar surface and may be disposed in front of the transmitter so that at least a portion of the transmitter is within the hollow interior space.

These and other embodiments and features of the invention will be still further apparent from the ensuing description, appended claims, and accompanying drawings.

BRIEF DESCRIPTION OF THE DRAWINGS

In the drawings, wherein like parts are identified by like numerals among the various views.

FURTHER DETAILED DESCRIPTION OF THE INVENTION

Figure 3:
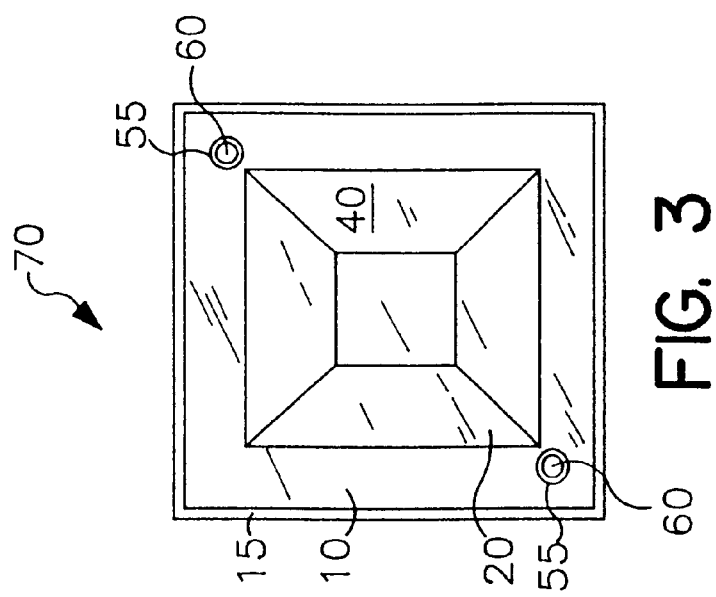
FIG. 3 is a back view of the device of FIG. 1.
Figure 2:
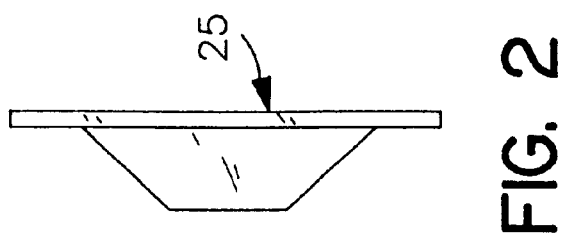
FIG. 2 serves as a side view, top view and bottom view of the device of FIG. 1 since in the form depicted, the device is symmetrical when viewed from the top, bottom and two sides.
Figure 1:
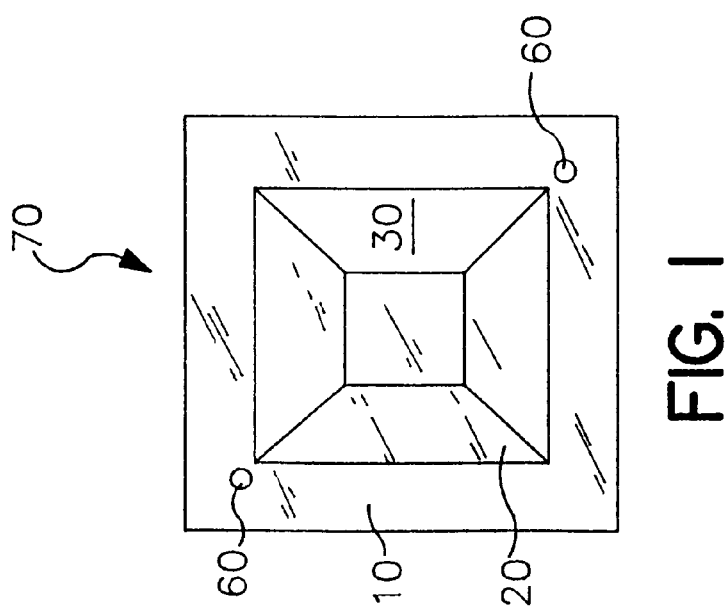
FIG. 1 is a front view of one preferred embodiment of a cover device of this invention.

The device such as depicted in FIGS. 1–3 is for mounting onto a planar surface, and to cover a lightwave source which is preferably an array of infrared light emitting diodes (not shown) of the type described above. For further details concerning such lightwave source (and a hand-held receiver for use therewith) reference may be had, for example, to commonly-assigned copending U.S. application Ser. No.08/496,970, filed Jun. 30, 1995, issued on Apr. 22, 1997 as U.S. Pat. No. 5,623,358, all disclosure of which is incorporated herein by reference as if fully set forth herein. It will be appreciated, however, that the cover can be used for covering other types of lightwave energy, such as visible light from lamp bulbs, in order to obtain distinctive light patterns.

The configuration of FIGS. 1–3 is highly advantageous as it is readily producible at low cost from readily-available appropriately thermoplastic materials by conventional injection molding techniques. The molding can be made to include frosting of the surface of the device. A preferred molded finish is commercially available from Mold-Tech, a division of Roehlen Industries, 3649 Conflans, Unit 102, Irving, Tex. 75061, sold under the mold finish number MT-11040.

When dye is desired, any conventional dye used in coloring a thermoplastic substance such as acrylonitrile butadiene styrene (ABS) can be employed to provide the coloration for the molded cover of this invention. So far as is known, there is nothing critical about the makeup of the dye so long as it provides an optically clear plastic medium of substantially uniform coloration over molded portions of uniform thickness. Thus the selection of the particular dye forms no part of this invention, provided only that the dye does not significantly inhibit or interfere with the effective transmission of the infrared signals through the thinned sections of the finished device.

Turning now to FIGS. 1–6, in the preferred form depicted, hollow device 70 is a unitary body having a planar peripheral wall segment 10, and a centrally-disposed forwardly projecting portion 20 having a front face 30 and a back face 40. Segment 10 and projecting portion 20 are contiguous with each other. The projecting portion 20 defines a hollow interior space 25 between the back face 40 of projecting portion 20 and the plane occupied by planar peripheral wall segment 10. Apertures 60 are provided in wall segment 10 to enable the device to be mounted against a suitable flat surface to cover the transmitter system.

In FIGS. 1–3 the unitary body has on back face 40, an optional flange 15 around the outer perimeter of wall segment 10 and a circular flange 55 around each aperture 60.

In the preferred form depicted, the entire front and back sides of the device (including wall segment 10 and portion 20) have a surface which has been molded to provide a frosted appearance so that the device is translucent.

It will be noted from FIGS. 1–3 that the projecting portion of the device has the configuration of a symmetrical four sided frusto-pyramid to which reference has been made hereinabove. The projecting portion may alternatively have almost any other geometric configuration, so long as the configuration does not adversely affect the transmission of lightwave signals through the projecting portion.

Figure 4:
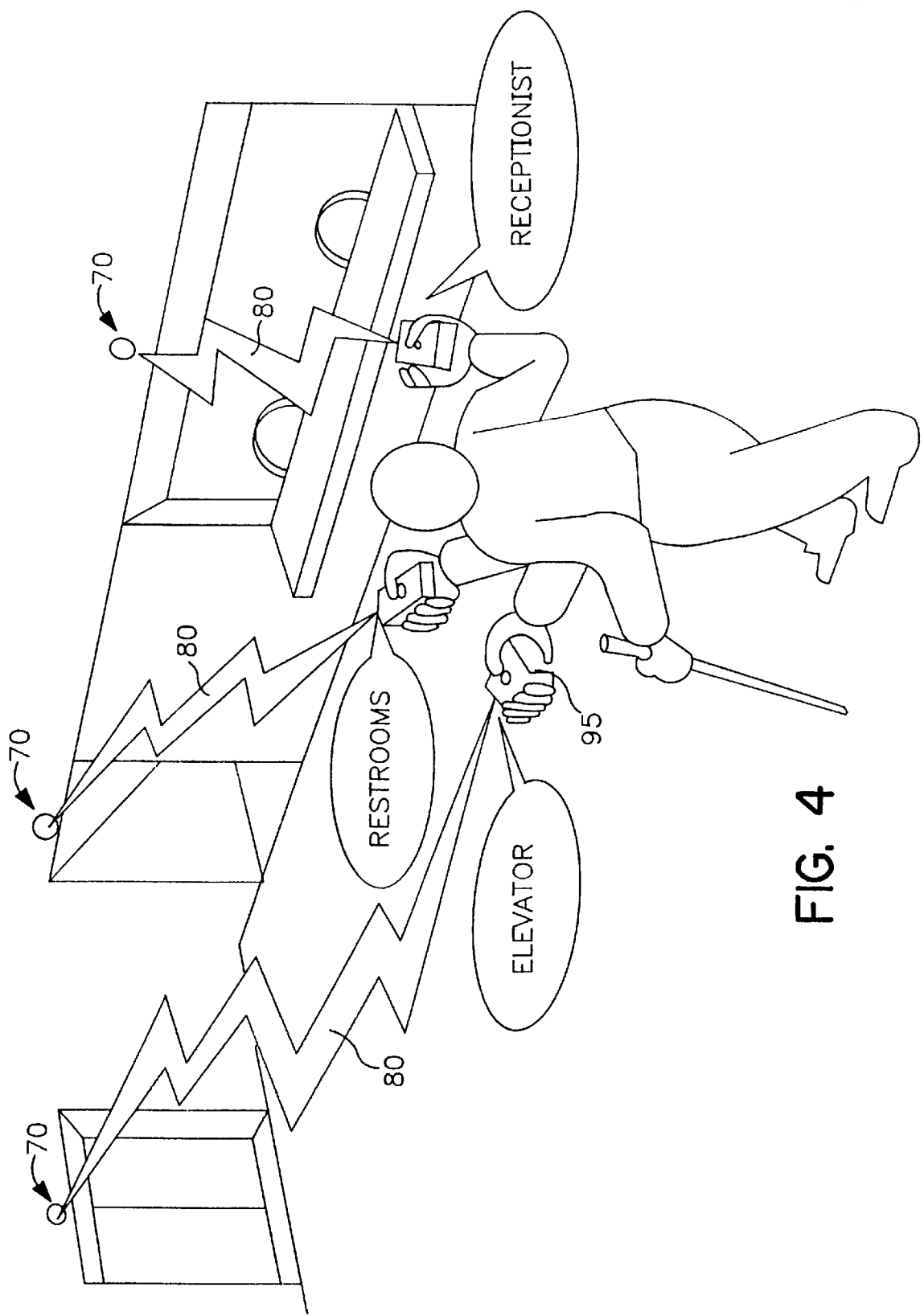
FIG. 4 is a schematic illustration of the manner in which apparatus for delivering directional lightwave energy in accordance with this invention can be used in the interior of a building for the purpose of guiding a print-disabled person to a location selected by that person.
Figure 5:
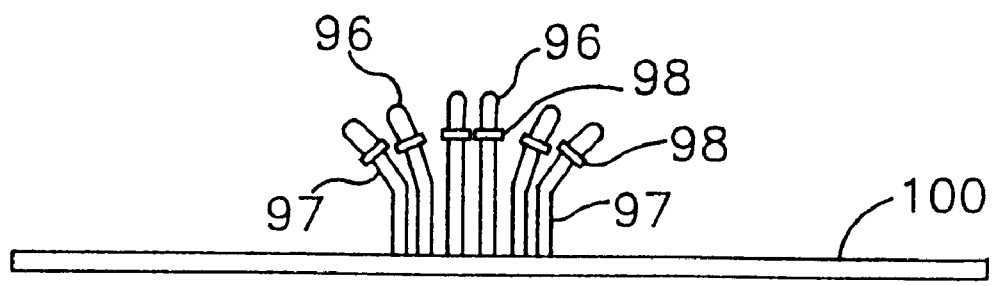
FIG. 5 is a side view of a transmitter circuit board from which extends a plurality of light emitting diodes in a preferred embodiment of this invention.

As indicated in FIG. 4, hollow device 70 is mounted at a suitable location for emitting a signal 80 which is picked up in a portable directional receiver 95 and converted audibly or otherwise into an intelligible communication to direct the person to the location desired. As seen on FIG. 5, to adjust the direction in which the lightwave signals are emitted from the transmitter behind the hollow device of this invention, each of a plurality of diodes 96 is provided with an extended pair of rigid yet bendable wires 97 which extend from a shoulder 98 of each diode to the transmitter circuit board 100. These wires are preferably long enough to permit each diode to extend into hollow interior space 25 between the back face 40 of projecting portion 20 and the plane occupied by planar peripheral wall segment 10 of the device of this invention, when installed. By being bendable yet rigid, wires 97 permit adjustment in the direction of the signal emitted by the diode and through the cover of this invention. In this way, the signals may be sent through the cover without substantial reduction in the intensity of the infrared signals, and may be sent in a direction or pattern which facilitates reception of the signals by the portable directional receiver. At the same time, the cover serves to camouflage the transmitter diodes and concurrently protect them from damage or abuse.

This invention is susceptible to considerable variation in its practice. Therefore the foregoing description is not intended to limit, and should not be construed as limiting, the invention to the particular forms of the invention described with reference to the Drawings. Rather, what is intended to be covered is as set forth in the ensuing claims and the equivalents thereof permitted as a matter of law.

What is claimed is:

1. A unitary hollow device for covering a source of lightwave energy, which device comprises a body comprising a translucent centrally-disposed forwardly projecting portion having a front face and a back face, the projecting portion having an infrared transparency in the range of about 0.70 to about 0.95.

2. A device according to claim 1 wherein the infrared transparency is in the range of about 0.80 to about 0.90.

3. A device according to claim 2 wherein the infrared transparency is about 0.90.

4. A device according to claim 1 wherein the body further comprises a translucent, planar peripheral segment, and wherein the device is further characterized in that:

a) the segment and the projecting portion are contiguous with each other; and b) the projecting portion defines a hollow interior space between the back face and the plane occupied by the planar peripheral wall segment.

5. A device according to claim 4 wherein the infrared transparency is in the range of about 0.80 to about 0.90.

6. A device according to claim 5 wherein the infrared transparency is about 0.90.

7. A device according to claim 6 wherein the body is formed from a plastic material.

8. A device according to claim 7 wherein the projecting portion has the configuration of a symmetrical four sided frusto-pyramid.

9. A device according to claim 8 wherein the plastic contains a substantially uniform amount of a dark coloration.

10. A device according to claim 1 wherein the projecting portion has the configuration of a symmetrical four sided frusto-pyramid.

11. A device according to claim 1 wherein the body is formed from a plastic material.

12. A device according to claim 11 wherein the plastic contains a substantially uniform amount of a dark coloration.

13. A device according to claim 1 formed by a process which comprises treating or molding one or more of the faces of the projecting portion to mark the surface thereof, thereby rendering the projecting portion translucent.

* * * * *